3,143,523
STABILIZED CRYSTALLINE POLYMERIC
OLEFINS
Cornelio Caldo, Terni, Italy, assignor to Montecatini Società Generale per l'Industria Mineraria e Chimica, a corporation of Italy
Filed Oct. 24, 1960, Ser. No. 64,418
Claims priority, application Italy Oct. 27, 1959
24 Claims. (Cl. 260—45.8)

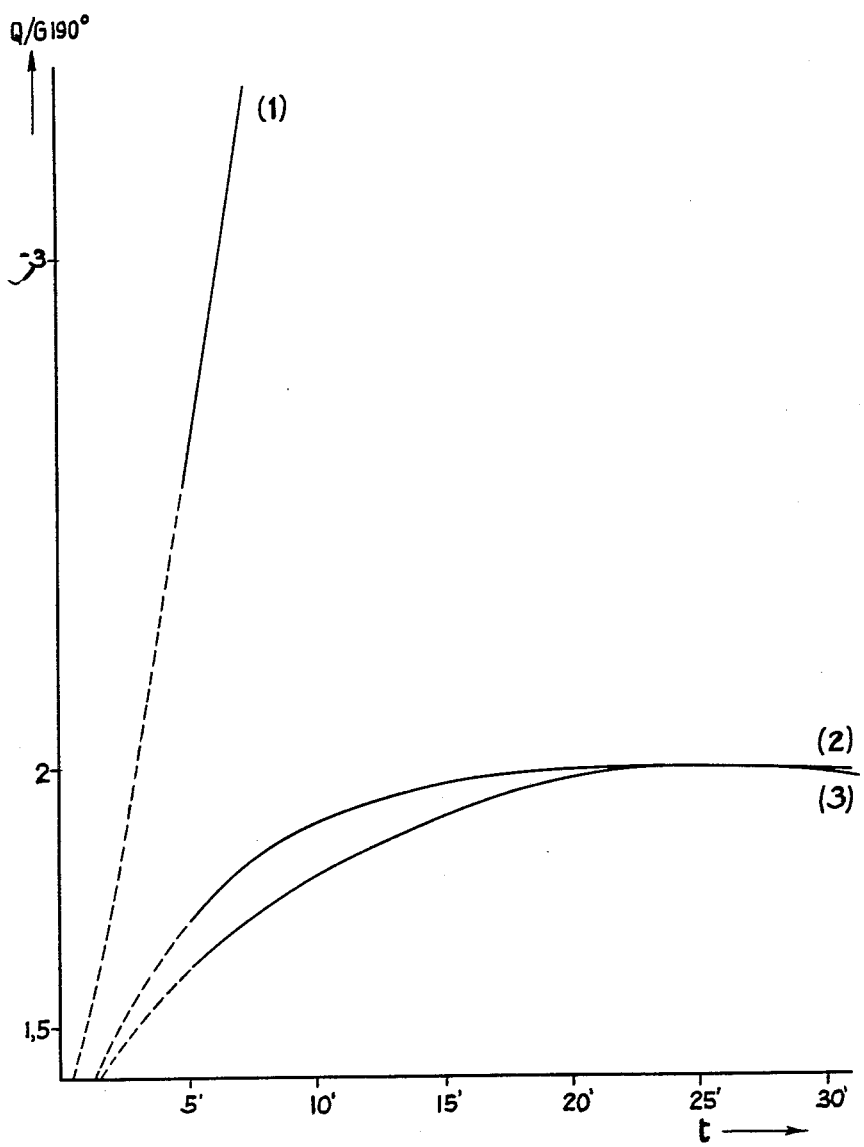

This invention relates to a method for stabilizing crystalline polymeric olefins, and articles comprising the same, against the deteriorating effects of heat, ageing and light. More particularly, the invention provides stabilized textile fibers and films comprising the crystalline polymeric olefins.

It is known that when manufactured articles comprising the crystalline polymeric olefins are worked at elevated temperatures and in the presence of atmospheric oxygen, the polymeric olefins undergo a certain amount of degradation.

An object of the present invention is to provide a new process for stabilizing the crystalline polymeric olefins against the deteriorating effects of heat, ageing, and light.

Another object is to provide shaped articles, particularly textile fibers and films, comprising the crystalline polymeric olefins, such as polyethylene, polypropylene and polybutene-1 which are stabilized against heat, ageing and light and which can be worked at elevated temperatures without any appreciable degradation of the polymeric olefin.

These and other objects of the invention are accomplished by the present invention in accordance with which it is found that various compounds containing the cyanoethyl group, —$CH_2$—$CH_2$—$CN$ in the molecule thereof are compatible with the crystalline polymeric olefins and, in small amounts up to 2% by weight, exert a marked stabilizing effect thereon. The present stabilizers are compatible with the fiber- and film-forming crystalline polymeric olefins per se and also with compositions comprising the polymeric olefins and various substances which improve the dyeing characteristics of the polymeric olefins, such as polyalkylenimines and basic nitrogenous compounds.

We find, according to this invention, that the cyanoethyl compounds listed below are both compatible with, and particularly effective stabilizers for, the crystalline polymeric olefins:

tris(betacyanoethyl) acetophenone
monobetacyanoethyl dodecylamine
di(beta-cyanoethyl) hydroquinone
monobetacyanoethyl octadecylamine
bis-9,9-(beta-cyanoethyl) fluorene
9-(betacyanoethyl) carbazole
bis-(betacyanoethyl) sulfide
betacyanoethyl phenol
di (betacyanoethyl) amine
tris(betacyanoethylethanol) amine
betacyanoethyl-2-oxynaphthalene
2,2,5,5-tetra-(beta-cyanoethyl) cyclopentanone
gamma acetyl-gamma isopropenylpimelonitrile
betacyanoethyl acetophenoxime
tris(beta cyanoethyl) nitromethane
betacyanoethyl dodecyl mercaptan The stabilizing agents according to the present invention can be obtained by reacting organic compounds containing active hydrogen atoms (e.g., phenols, alcohols, amines, imines, mercaptanes, compounds containing active methylene groups, nitrocompounds, sulphones, aldehydes, ketones, compounds containing a group =CH, —$CH_2$—, or —$CH_3$ near the nitric, —$SO_2$—, aldehydic or keto group respectively, halogen derivatives, etc.) with acrylonitrile or with another cyanethylation agent (such as e.g., $CH_2OH$—$CH_2CN$; $(C_2H_5)_2$=N—$CH_2$=$CH_2$—CN; the salt of $CH_3I$ with beta-cyanoethyl diethylamine, etc.).

In practicing the invention, the selected cyanoethyl compound or plurality of such compounds, is generally, by any suitable means, mixed with the selected polymeric olefin to be stabilized, under agitation. However, the cyanoethyl compounds may also be combined with the polymeric olefins by other methods, such as by mixing the polymeric olefin with a solution of the selected cyanoethyl compound in a suitable solvent, followed by evaporation of the solvent, or by adding the cyanoethyl compound to the polymeric olefin at the end of the polymerization process by which the polymeric olefin is obtained.

It is also possible to obtain the stabilizing action by applying the cyanoethyl compounds on the manufactured article, e.g., by immersing the article in a solution or dispersion of the cyanoethyl compound and then evaporating the solvent.

The cyanoethyl compounds listed above are compatible with the polymeric olefins in the molten state and have no spot action.

In the accompanying drawing, the curves of the single figure were obtained by measuring the extent of degradation at 270° C. of a composition consisting of a crystalline textile fiber-forming polypropylene made up prevailingly of isotactic macromolecules non-extractable with boiling n-heptane, and compositions comprising the polypropylene plus a small amount of a stabilizer according to the present invention. In the figure, curves 1 to 3 inclusive refer to the following compositions:

(1) polypropylene
(2) polypropylene+0.2% 9-(beta-cyanoethyl)carbazole
(3) polypropylene+0.2% di(beta-cyanoethyl)hydroquinone The polypropylene used had an intrinsic viscosity of 1.51, a residue after heptane extraction of 94.5% and an ash content of 0.23%.

The determination of the degradation consists of determining in successive times the ratio $Q/G$, where Q is the fluidity index of the polymer at the degradation temperature used and is determined by flow-rate measures; G is the melt index determined at 190° C.

The curves of the accompanying figure show that, while the polypropylene (1) degrades quickly, compositions (2) and (3) to which the stabilizers according to the present invention are added, are effectively stabilized against degradation, under the same conditions.

The mass comprising the polymeric olefin and the stabilizer can be extruded or spun into mono- or multi-filaments which can be cut or otherwise disrupted to fibers, or the mass can be formed into films, tapes, conventional or bulky yarns, etc., all of which are characterized by exceptionally good resistance to the effects of heat, age, and light.

The following examples illustrate the present invention without limiting its scope.

*Example 1*

A homogeneous mixture of 49.9 kg. polypropylene (having: [η]=1.40 determined in tetrahydronaphthalene at 135° C., residue after heptane extraction=95.9%, ash content=0.13%; and obtained by polymerizing propylene in contact with a stereospecific catalyst), and 0.1 kg. bis-9,9-(betacyanoethyl)-fluorene, having a melting point of 118–119° C. (obtained by reacting 2.1 mols acrylonitrile with 1 mole fluorene in dioxane in the presence of benzyltrimethylammonium hydroxide), is prepared in a Werner type mixer at room temperature.

The homogeneous blend is melted in a test tube in a thermostatic bath at 250° C. for 10 minutes thus giving an almost colorless molten mass. The blend is spun into filaments in a melt spinning device under the following conditions:

Screw temperature_____ 260° C.
Head temperature_____ 250° C.
Spinneret temperature_____ 240° C.
Spinneret type_____ 60/0.8x16
Maximum pressure_____ 30 kg./cm.²
Winding speed_____ 240 m./minute The continuous filament is stretched with a stretching ratio of 1:5 at 160° C. The serimetric characteristics of the continuous filament thus obtained are:

Tenacity _____g./den__ 5.17
Elongation _____percent__ 24

The intrinsic viscosity of the polypropylene in this filament is 1.2 (determined as above), while the intrinsic viscosity of the filament obtained from the same polymer not previously mixed with the stabilizer, is 1.02.

When the stabilized filament is kept for 5 hours at 130° C. in an oven in which air is circulated, its characteristics are practically unaltered.

*Example 2*

A homogeneous mixture of 49.9 kg. polypropylene (obtained by polymerizing propylene in contact with a stereospecific catalyst and having $[\eta]=1.40$, a residue after heptane extraction of 95.9%, an ash content of 0.13%) and 0.1 kg. tris-(betacyanoethyl) acetophenone having a melting point of 128–129° C. (obtained by reacting 3.1 mols acrylonitrile with 1 mole acetophenone in the presence of benzyltrimethylammonium hydroxide) is prepared in a Werner type mixer at room temperature.

The mixture is melted in a test tube in a thermostatic bath at 250° C. for 10 minutes thus giving an almost colorless molten mass.

The mix is spun in a melt spinning device under the following conditions:

Screw temperature_____ 260 C.
Head temperature_____ 250° C.
Spinneret temperature_____ 240° C.
Spinneret type_____ 60/0.2x16
Maximum pressure_____ 30 kg./cm.²
Winding speed_____ 240 m./minute The continuous filament is stretched (stretching ratio 1:5) at 160° C. The serimetric characteristics of the filament obtained are the following:

Tenacity _____g./den__ 5.55
Elongation _____percent__ 21.8

The intrinsic viscosity of the stabilized filament is 1.2 while the filament obtained from the same polymer without the stabilizer presents an $[\eta]$ of 1.02.

The stabilized filament is examined after exposure at 130° C. for 5 hours in an oven provided with circulating air; its characteristics remain practically unchanged.

*Example 3*

A homogeneous mixture of 49.9 kg. polypropylene (having $[\eta]=1.58$, residue after heptane extraction =97.9%, ash content=0.12% and obtained by the stereospecific polymerization of propylene), and 0.1 kg. 9-(betacyanoethyl) carbazole having a melting point of 155° C. (obtained by reacting 1 mole carbazole with 3.8 mols acrylonitrile in the presence of benzyltrimethylammonium hydroxide) is prepared in a Werner type mixer at room temperature.

The mixture is melted in a test tube in a thermostatic bath at 250° C. for 10 minutes thus giving an almost colorless molten mass which is spun into filaments using a melt spinning device under the following conditions:

Screw temperature_____ 260° C.
Head temperature_____ 250° C.
Spinneret temperature_____ 240° C.
Spinneret type_____ 60/0.8x16
Maximum pressure_____ 55 kg./cm.²
Winding speed_____ 300 m./minute The continuous filament is stretched (stretching ratio 1:4.5) at 160° C. The serimetric characteristics of the filament obtained are the following:

Tenacity _____g./den__ 4.5
Elongation _____percent__ 27.8

The stabilized filament has an intrinsic viscosity of 1.32 while the filament obtained from the same polymer without the stabilizer has an intrinsic viscosity of 1.09.

The characteristics of the stabilized filament are practically unchanged after exposure at 130° C. for 5 hours in an oven provided with air circulation.

*Example 4*

A homogeneous mixture of 49.9 kg. polypropylene (having $[\eta]=1.40$, residue after heptane extraction =95.9%, ash content =0.13, and prepared with the aid of stereospecific catalysts) and 0.1 kg. di-(betacyanoethyl) hydroquinone (obtained by reacting 1 mole hydroquinone with 2 mols acrylonitrile in the presence of metallic sodium at 120–130° C.) is prepared in a Werner type mixer.

The mixture is melted in a test tube in a thermostatic bath at 250° C. for 10 minutes; an almost colorless molten mass is thus obtained.

The mix is spun in a melt spinning device under the following conditions:

Screw temperature_____ 260° C.
Head temperature_____ 250° C.
Spinneret temperature_____ 240° C.
Spinneret type_____ 60/0.1x16.
Maximum pressure_____ 30 kg./cm.²
Winding speed_____ 240 m./min.

The continuous filament obtained is stretched at 160° C. (stretching ratio 1:5.3). The serimetric characteristics of the stretched filament are as follows:

Tenacity _____g./den__ 5.46
Elongation _____percent__ 20.2

The intrinsic viscosity of the stabilized filament is 1.22, while the filament obtained from the same polymer but without the stabilizer has an intrinsic viscosity of 1.02.

The stabilized filament, after heating at 130° C. for 5 hours, shows practically no change in its characteristics.

*Example 5*

A homogeneous mixture of 49.9 kg. polypropylene (having an intrinsic viscosity of 1.40, a residue after heptane extraction of 95.9%, and an ash content of 0.13%, and obtained by the polymerization of propylene by means of a stereospecific catalyst) and 0.1 kg. tris (betacyanoethyl ethanol) amine (obtained by reacting 1 mol triethanolamine with 3 mols acrylonitrile in the presence of sodium methylate) is prepared in a Werner type mixer at room temperature.

The mixture is melted in a test tube in a thermostatic bath at 250° C. for 10 minutes, yielding an almost colorless molten mass, which is spun in a melt spinning device under the following conditions:

Screw temperature_____ 260° C.
Head temperature_____ 250° C.
Spinneret temperature_____ 240° C.
Spinneret type_____ 60/0.8x16.
Maximum pressure_____ 30 kg./cm.²
Winding speed_____ 240 m./min.

The continuous filament is stretched at 160° C. (stretching ratio 1:4.8). The serimetrical characteristics of the filaments obtained are:

Tenacity _____ g./den__ 5.4
Elongation _____ percent__ 22.7

The intrinsic viscosity of the stablized filament is 1.22 while the filament obtained from the same polymer without the stabilizer has an intrinsic viscosity of 1.02.

Exposure of the stabilized filament at 130° C. for 5 hours in an oven provided with air circulation does not result in any appreciable change in its properties.

Example 6

A homogeneous mixture of 49.9 kg. polypropylene (having an intrinsic viscosity of 1.58, a residue after heptane extraction of 97.9%, an ash content of 0.12%, and prepared with the aid of stereospecific catalysts) with 0.1 kg. betacyanoethyl phenol, having a melting point of 62–65° C. (obtained by reacting 1.0 mole phenol with 1.0 mole acrylonitrile, in the presence of metallic sodium, at 130–140° C.) is prepared in a Werner type mixer at room temperature.

The mixture is melted in a test tube in a thermoplastic bath at 250° C. for 10 minutes; an almost colorless molten mass is thus obtained. The mass is spun in a melt spinning device under the following condition:

Screw temperature_____ 260° C.
Head temperature_____ 250° C.
Spinneret temperature_____ 240° C.
Spinneret type_____ 60/0.8x16.
Maximum pressure_____ 40 kg./cm.$^2$
Winding speed_____ 300 m./min.

The continuous filament is stretched at 160° C. (stretching ratio 1:4.3). The serimetrical characteristics of the filament thus obtained are:

Tenacity _____ g./den__ 3.94
Elongation _____ percent__ 31.4

The intrinsic viscosity of the stabilized filament is 1.25 while the filament obtained from the same polymer without the stabilizer has an [η] of 1.09.

The properties of the stabilized filament remain practically unaltered after heating thereof at 130° C. for 5 hours in an oven provided with air circulation.

Example 7

89 l. n-heptane, 66 g. TiCl$_3$, 97 g. triethyl aluminum and 105 l. propylene are introduced into a 200 liter reactor provided with an agitator. The mass is agitated for 22 hours at 75° C.

A solution of 25 g. 9-(betacyanoethyl)-carbazole in 250 cc. n-butyl alcohol is added to the polymerization reaction mass and thereafter the mass is centrifuged and dried.

The polypropylene thus obtained has an intrinsic viscosity of 1.44, a residue after heptane extraction of 97.4%, an ash content of 0.19%, and has incorporated therein the cyanoethyl compound.

The mix is spun in a melt spinning device under the following conditions:

Screw temperature_____ 250° C.
Head temperature_____ 230° C.
Spinneret temperature_____ 220° C.
Spinneret type_____ 60/0.8 x 16
Maximum pressure_____ 30 kg./cm.$^2$
Winding speed_____ 250 m./min.

The continuous filament is stretched with a stretching ratio of 1:5.3 at 150° C. The filament obtained presents the following serimetric characteristics:

Tenacity _____ g./den__ 5.08
Elongation _____ percent__ 28

The intrinsic viscosity of the stabilized filament is 1.28 while that of the filament obtained from the same polymer without any stabilizer is 1.02. The stabilized filament shows substantially no change in its characteristics when it is heated for 5 hours at 130° C. in an oven provided with air circulation.

Example 8

Stretched polypropylene filaments obtained from a polymer having an intrinsic viscosity of 1.58, a residue after heptane extraction of 97.9%, an ash content of 0.12%, are immersed for 10 minutes in a 1% solution of 9-(betacyanoethyl) carbazole in tetrahydrofurane, and then dried.

After this treatment the filament presents the following characteristics:

Tenacity _____ g./den__ 3.21
Elongation _____ percent__ 44.7

After being heated for 5 hours at 130° C. in an oven through which air is circulated, the filaments show practically no alteration in their characteristics.

Example 9

A homogeneous mixture of 49.9 kg. polypropylene (having an intrinsic viscosity of 1.7, a residue after heptane extraction of 97%, an ash content of 0.22%, produced with the aid of a stereospecific catalyst) and 0.1 kg. 2,2,5,5-tetra(betacyanoethyl) cyclopentanone, having a melting point of 175° (obtained by reacting 1 mole cyclopentanone, with 4 mols acrylonitrile in the presence of benzyl trimethylammonium hydroxide) is prepared in a Werner type mixer at room temperature.

The mix is spun in a melt spinning device under the following conditions:

Screw temperature_____ 270° C.
Head temperature_____ 250° C.
Spinneret temperature_____ 240° C.
Spinneret type_____ 60/0.8 x 16
Maximum pressure_____ 50 kg./cm.$^2$
Winding speed_____ 340 m./min.

The continuous filament is stretched with a stretching ratio of 1:5.3 at 160° C. The serimetric characteristics of the filaments are:

Tenacity _____ g./den__ 4.55
Elongation _____ percent__ 19.5

The intrinsic viscosity of the stabilized filament is 1.22 while that of the filament obtained from the same polymer without addition of the stabilizer is 1.02.

The stabilized filament, after heating at 130° C. for 5 hours in an oven in which air is circulated, shows almost no change in its characteristics.

Example 10

A homogeneous mixture of 49.9 kg. polypropylene (having an intrinsic viscosity [η] of 1.7, a residue after heptane extraction of 97%, an ash content of 0.22%, and obtained by polymerizing propylene in contact with a stereospecific catalyst), and 0.1 kg. gamma-acetyl-gamma-isopropenyl-pimelonitrile, having a melting point of 116° C. (obtained by reacting 1 mole mesityl oxide with 2 mols acrylonitrile in the presence of benzyl trimethyl ammonium hydroxide) is prepared in a Werner mixer at room temperature.

This mix is spun in a melt spinning device under the following conditions:

Screw temperature_____ 270° C.
Head temperature_____ 240° C.
Spinneret temperature_____ 230° C.
Spinneret type_____ 60/0.8 x 16
Maximum pressure_____ 45 kg./cm.$^2$
Winding speed_____ 340 m./min.

The continuous filament is stretched with a stretching ratio of 1:5.3 at 160° C. The filament obtained presents the following serimetric characteristics:

Tenacity _____g./den__ 4.72
Elongation _____percent__ 21.7

The intrinsic viscosity of the stabilized continuous filament is 1.26, while that of the filament obtained from the same polymer but without addition of the stabilizer is 1.02.

The stabilized filament, after being heated at 135° C. for 5 hours in an oven provided with air circulation shows essentially the same tenacity and elongation.

*Example 11*

A homogeneous mixture of 49.9 kg. polypropylene (having an intrinsic viscosity of 1.42, a residue after heptane extraction of 96.3%, an ash content of 0.1% and prepared with the aid of a stereospecific catalyst) and 0.1 kg. betacyanoethyl acetophenonoxime, having a melting point of 44° C. (obtained by reacting 1 mole acetophenonoxime with 1 mole acrylonitrile in the presence of benzyltrimethylammonium hydroxide) is prepared in a Werner type mixer at room temperature.

The mix is spun in a melt spinning device under the following conditions:

Screw temperature_____ 230° C.
Head temperature_____ 230° C.
Spinneret temperature_____ 220° C.
Spinneret type_____ 60/0.8 x 16.
Maximum pressure_____ 20 kg./cm.².
Winding speed_____ 250 m./min.

The continuous filament is stretched with a stretching ratio of 1:5.3 at 145° C. The filament thus obtained presents the following serimetric characteristics:

Tenacity _____g./den__ 5
Elongation _____percent__ 15.3

The intrinsic viscosity of the filament is 1.29 while that of the filament obtained from the same polymer but without adding the stabilizer is 1.03.

The stabilized filament, after being held at 130° C. for 7 hours in an oven provided with air circulation, shows essentially the same tenacity and elongation.

*Example 12*

A homogeneous mixture is prepared in a Werner type mixer at room temperature from 49.9 kg. polypropylene (having an intrinsic viscosity [$\eta$] of 1.42, a residue after heptane extraction of 96.3%, an ash content of 0.1% and which was obtained by polymerizing propylene with a stereospecific catalyst) and 0.1 kg. of tris-(betacyanoethyl)nitromethane having a melting point of 114° C. (obtained according to a modification of the method of Bruson and Riener, J.A.C.S. 1943 page 23, Bruson U.S.A. Patent 2,361,259 by reacting 1 mole nitromethane with 3.1 mols acrylonitrile in the presence of sodium methylate, allowing the mass to stand overnight, acidifying the mass with a diluted hydrochloric acid solution, precipitating tris-cyanoethyl-nitromethane by adding ethyl ether, and then crystallizing it from alcohol).

The mix was spun in a melt spinning device under the following conditions:

Screw temperature_____ 230° C.
Head temperature_____ 230° C.
Spinneret temperature_____ 220° C.
Spinneret type_____ 60/0.8 x 16.
Maximum pressure_____ 20 kg./cm.².
Winding speed_____ 250 m./min.

The continuous filament is stretched with a stretching ratio of 1:5.3 at 145° C.

The filament thus obtained presents the following serimetric characteristics:

Tenacity _____g./den__ 5.1
Elongation _____percent__ 15.6

The intrinsic viscosity of this stabilized filament is 1.29 while that of the filament obtained from the same polymer but without addition of the stabilizer is 1.03.

The stabilized filament, after heating at 130° C. for 7 hours in an oven provided with air circulation shows practically no variation in its characteristics.

*Example 13*

A homogeneous mixture of 49.9 kg. polypropylene (having the following characteristics [$\eta$] 1.26, ash content 0.036%, residue after heptane extraction 93.7%, prepared with the aid of stereospecific catalysts) and 0.1 kg. betacyanoethyl dodecylamine (obtained by reacting 1.2 mols acrylonitrile with 1 mol dodecylamine in the presence of sodium methylate) is prepared in a Werner type mixer at room temperature. This mix is spun with a melt spinning device under the following conditions:

Screw temperature_____ 240° C.
Head temperature_____ 210° C.
Spinneret temperature_____ 200° C.
Spinneret type_____ 60/0.8 x 16.
Maximum pressure_____ 20 kg./cm.².
Winding speed_____ 250 m./min.

The filaments are stretched in water vapor at 150° C. with a stretching ratio of 1:5.3. The serimetric characteristics of the filaments obtained are as follows:

Tenacity _____g./den__ 5.56
Elongation _____percent__ 23.1

The stabilization against degradation during the working, given to the composition by the cyanoethyl ester, is evident from the fact that the intrinsic viscosity of the continuous filament is 1.23 while that of the filament obtained from the same polymer but without addition of the stabilizer is only 0.95.

The stabilized filament, after exposure to the action of heat in an oven provided with air circulation for 5 hours at 130° C., shows practically no alteration in its characteristics.

After it is exposed to the rays of a 100-watt U.V. lamp for 20 hours, the stabilized filament retains 50% of its initial tenacity while the filament obtained from the same polymer without addition of the stabilizer only retains 27% of its initial tenacity after such exposure.

*Example 14*

A homogeneous mixture of 49.8 kg. polypropylene (having the following characteristics [$\eta$] 1.54, ash content 0.012%, residue after heptane extraction 97.2%, and prepared with the aid of a stereospecific catalyst) and 0.2 kg. cyanoethyl laurylmercaptan (obtained by reacting 1 mole lauryl mercaptan with 1.2 mols acrylonitrile in the presence of sodium methylate) is prepared in a Werner type mixer at room temperature. This mix is spun in a melt spinning device under the following conditions:

Screw temperature_____ 250° C.
Head temperature_____ 220° C.
Spinneret temperature_____ 210° C.
Spinneret type_____ 60/0.8 x 16.
Maximum pressure_____ 22 kg./cm.².
Winding speed_____ 270 m./min.

The continuous filament is stretched in water vapor with a stretching ratio of 1:5.3 at 160° C.

The serimetric characteristics of the filament thus obtained are as follows:

Tenacity _____g./den__ 4.93
Elongation _____percent__ 26.7

The stabilization against degradation during the working, given by the cyanoethyl compound to the composition, is evident from the fact that the intrinsic viscosity of the filament is 1.36 while that of the filament obtained from the same polymer but without addition of the stabilizer, is 0.88.

The stabilized filament after exposure for 5 hours to the action of heat in an oven provided with air circulation at 130° C., retains its characteristics practically unchanged.

Example 15

A homogeneous mixture of 49.9 kg. polypropylene (and having the following characteristics [$\eta$] 1.54, ash content 0.012%, residue after heptane extraction 97.2%, and prepared with the aid of a stereospecific catalyst) and 0.1 kg. monocyanoethyl octadecylamine (obtained by reacting 1 mole octadecylamine with 1.2 mols acrylonitrile in the presence of benzyltrimethylammonium hydroxide) is prepared in a Werner type mixer at room temperature.

This mix is spun in a melt spinning device under the following conditions:

| | |
|---|---|
| Screw temperature | 250° C. |
| Head temperature | 220° C. |
| Spinneret temperature | 210° C. |
| Spinneret type | 60/0.8 x 16. |
| Maximum pressure | 20 kg./cm.$^2$. |
| Winding speed | 280 m./min. |

The continuous filament is stretched in water vapor at 160° C. with a stretching ratio of 1:5.3. The serimetric characteristics of the filament thus obtained are the following:

| | |
|---|---|
| Tenacity | g./den 5.56 |
| Elongation | percent 24.9 |

The stabilization against the degradation during the working, given to the composition by the cyanoethyl compound, is evident from the fact that the intrinsic viscosity of the filament is 1.37 while that of the filament obtained from the same polymer but without addition of the stabilizer is 0.88.

The stabilized filament after being heated at 130° C. for 5 hours in an oven provided with air circulation has properties which are almost unaltered.

Example 16

A homogeneous mixture of 45 kg. polypropylene (having the following characteristics: [$\eta$] 1.26, ash content 0.036%, residue after heptane extraction 93.7% and prepared with the aid of a stereospecific catalyst), and 4.9 kg. polybutene (obtained with the aid of a stereospecific catalyst) and with 0.1 kg. 9-(betacyanoethyl) carbazole (obtained by reacting 1 mole carbazole with 3.8 mols acrylonitrile in the presence of benzyltrimethylammonium hydroxide) is prepared in a Werner type mixer at room temperature.

This mix is spun in a melt spinning device under the following conditions:

| | |
|---|---|
| Screw temperature | 220° C. |
| Head temperature | 210° C. |
| Spinneret temperature | 200° C. |
| Spinneret type | 60/0.8 x 16. |
| Maximum pressure | 18 kg./cm.$^2$. |
| Winding speed | 320 m./min. |

The continuous filament is stretched in an atmosphere of water vapor with a stretching ratio of 1:5.3 at 160° C.

The serimetric characteristics of the filament thus obtained are as follows:

| | |
|---|---|
| Tenacity | g./den 4.9 |
| Elongation | percent 22 |

The stabilization against the degradation during the working, given to the composition by the cyanoethyl compound, is evident from the fact that the intrinsic viscosity of the filament is 1.27 while that of a filament obtained from the same polymer mixture but without addition of the stabilizer is 0.98. The stabilized filament after exposure to the action of heat in an oven provided with air circulation at 130° C. for 5 hours, shows almost no change in its characteristics.

Example 17

A homogeneous mixture of 49.9 kg. polyethylene having a molecular weight of about 50,000, prepared with the aid of stereospecific catalysts, and 0.1 kg. di-gamma-acetyl-gamma-isopropenyl pimelonitrile (obtained by reacting 1 mole mesityl oxide with 2 mols acrylonitrile in the presence of benzyltrimethylammonium hydroxide) is prepared in a Werner type mixer at room temperature.

This mix is spun in a spinning device under the following conditions:

| | |
|---|---|
| Spinning temperature | 190° C. |
| Spinneret type | 1/0.8 x 16. |
| Maximum pressure | 17 kg./cm.$^2$. |
| Winding speed | 175 m./min. |

The continuous filament is stretched in water vapor at 160° C. with a stretching ratio of 1:5.3.

The serimetric characteristics of the filament thus obtained are as follows:

| | |
|---|---|
| Tenacity | g./den 3.2 |
| Elongation | percent 27 |

The stabilization against degradation during the working, given to the composition by the cyanoethyl compound, is evident from the fact that the molecular weight of the filament is of about 42,000 while that of a filament obtained from the same polymer but without addition of the stabilizer is of 27,000.

The stabilized filament, after exposure for 5 hours to the action of heat in an oven provided with air circulation at 100° C., retains its characteristics without any appreciable alteration.

Example 18

A homogeneous mixture of 49.9 kg. polypropylene (having the following characteristics [$\eta$] 1.54, ash content 0.012, residue after heptane extraction 97.2%), and prepared with the aid of a stereospecific catalyst, 0.1 kg. bis-(betacyanoethyl) sulfide (obtained by reacting 2 mols sodium sulfide with 4 mols acrylonitrile) is prepared in a Werner type mixer at room temperature.

This mix is spun in a melt spinning device under the following conditions:

| | |
|---|---|
| Screw temperature | 60/0.8 x 16 |
| Head temperature | 23 kg./cm.$^2$ |
| Spinneret temperature | 240m./min. |
| Spinneret type | 60/0.8 x 16. |
| Maximum pressure | 23 kg./cm.$^2$. |
| Winding speed | 240 m./min. |

The filament is stretched in water vapor at 160° C. with a stretching ratio of 1:5.3.

The serimetric characteristics of the filament thus obtained are as follows:

| | |
|---|---|
| Tenacity | g./den 5.07 |
| Elongation | percent 21 |

The stabilization against degradation during the working, given to the composition by the cyanoethyl compound, is evident from the fact that the intrinsic viscosity of the filaments is 1.39 while that of the filaments obtained from the same polymer but without addition of the stabilizer is 0.88.

The stabilized filament, after exposure for 5 hours to the action of heat in an oven provided with air circulation at 130° C., maintains its characteristics almost unaltered.

Example 19

A homogeneous mixture of 49.9 kg. polypropylene (having the following characteristics: [$\eta$] 1.26, ash content 0.036%, residue after heptane extraction 93.7%), prepared with the aid of a stereospecific catalyst, and 0.1 kg. dicyanoethylamine (obtained by reacting 1 mole ammonia with 2.2 mols acrylonitrile) is prepared in a Werner type mixer at room temperature.

This mix is spun in a melt spinning device under the following conditions:

| | |
|---|---|
| Screw temperature | 240° C. |
| Head temperature | 210° C. |
| Spinneret temperature | 200° C. |
| Spinneret type | 60/0.8 x 16. |
| Maximum pressure | 23 kg./cm.² |
| Winding speed | 240 m./min. |

The continuous filament is stretched in water vapor at 160° C. with a stretching ratio of 1:5.3.

The serimetric characteristics of the filament thus obtained are as follows:

| | |
|---|---|
| Tenacity g./den. | 5.2 |
| Elongation percent | 26 |

The stabilization against degradation during the working, given to the composition by the cyanoethyl compound, is evident from the fact that the intrinsic viscosity of the filament is 1.24 while that of the filament obtained from the same polymer but without addition of the stabilizer is 0.95.

The stabilized filament, after exposure for 5 hours to the action of heat in an oven provided with air circulation at 130° C., retains its characteristics almost unaltered.

*Example 20*

A mixture of 49.9 kg. polypropylene (having the following characteristics [η] 1.54, ash content 0.012%, residue after heptane extraction 97.2%), prepared with the aid of a stereospecific catalyst, and 0.1 kg. 1-(betacyanoethyl)-2-oxynaphthalene (obtained by reacting 1 mole betanaphtol with 1 mole acrylonitrile in the presence of sodium hydroxide) is prepared in a Werner type mixer at room temperature. This mix is spun in a melt spinning device under the following conditions:

| | |
|---|---|
| Screw temperature | 250° C. |
| Head temperature | 220° C. |
| Spinneret temperature | 210° C. |
| Spinneret type | 60/0.8 x 16. |
| Maximum pressure | 17 kg./cm.² |
| Winding speed | 270 m./min. |

The continuous filament is stretched in water vapor at 160° C. with a stretching ratio of 1:5.3.

The serimetric characteristics of the filament thus obtained are as follows:

| | |
|---|---|
| Tenacity g./den. | 4.7 |
| Elongation percent | 23 |

The stabilization against degradation during the working, given to the composition by the cyanoethyl compound, is evident from the fact that the intrinsic viscosity of the filament is 1.31 while that of the filament obtained from the same polymer but without addition of the stabilizer is 0.88.

The stabilized filament, after heating for 5 hours at 130° C. in an oven provided with air circulation, shows almost no change in its characteristics.

The catalysts which were used to produce the polypropylene and polybutene-1 recited in the examples are the stereospecific catalysts of Natta et al. described in various pending applications, including Ser. No. 550,164.

A typical stereospecific catalyst according to Natta et al. is the one prepared from violet crystalline TiCl₃ and triethyl aluminum. The polypropylene and polybutene-1 obtained using such catalysts consist prevailingly of isotactic macromolecules, i.e., crystallizable macromolecules having substantially the stereoregular "isotactic" structure.

It is apparent from the foregoing example that the cyanoethyl substituted compounds are highly effective stabilizers for the crystalline polymeric olefins. Various changes may be made in carrying out the invention without departing from it, and we intend to include in the scope of the appended claims all such variations as may be apparent to those skilled in this art from the disclosures made herein.

I claim:
1. A process for stabilizing the crystalline polymeric olefins against the action of heat, ageing and light, comprising mixing a polymeric olefin selected from the group consisting of polyethylene, polypropylene and polybutene, from about 0.02 to 2% by weight of a betacyanoethyl compound selected from the group consisting of tris(betacyanoethyl) acetophenone, monobetacyanoethyl dodecylamine, di(betacyanoethyl) hydroquinone obtained by reacting hydroquinone with acrylonitrile in molar proportions of 1:2 in the presence of metallic sodium at 120–130° C., monobetacyanoethyl octadecylamine, bis-9,9-(betacyanoethyl) fluorene, 9-(betacyanoethyl) carbazole, bis(betacyanoethyl) sulfide, betacyanoethyl phenol having a melting point of 62–65° C., di(betacyanoethyl) amine, tris(betacyanoethyl ethanol) amine, betacyanoethyl-2-oxynaphthalene, 2,2,5,5-tetra(betacyanoethyl) cyclopentanone, gamma acetyl-gamma isopropenylpimelonitrile, betacyanoethyl acetophenoxime, tris(betacyanoethyl) nitromethane, and betacyanoethyl dodecylmercaptan.

2. A composition comprising a polymeric olefin selected from the group consisting of polyethylene, polypropylene and polybutene and for stabilizing the polymeric olefin against the action of heat, ageing and light from about 0.02 to 2% by weight of a betacyanoethyl compound selected from the group consisting of tris(betacyanoethyl) acetophenone, monobetacyanoethyl dodecylamine, di(betacyanoethyl) hydroquinone obtained by reacting hydroquinone with acrylonitrile in molar proportions of 1:2 in the presence of metallic sodium at 120–130° C., monobetacyanoethyl octadecylamine, bis-9,9-(betacyanoethyl) fluorene, 9-(betacyanoethyl) carbazole, bis(betacyanoethyl) sulfide, betacyanoethyl phenol having a melting point of 62–65° C., di(betacyanoethyl) amine, tris(betacyanoethyl ethanol) amine, betacyanoethyl-2-oxynaphthalene, 2,2,5,5-tetra(betacyanoethyl) cyclopentanone, gamma acetyl-gamma isopropenylpimelonitrile, betacyanoethyl acetophenoxime, tris(betacyanoethyl) nitromethane, and betacyanoethyl dodecylmercaptan.

3. Mono- and multi-filaments, staple fibers, dyeable yarns, bulk yarns, films, and tapes comprising a crystalline polymeric olefin selected from the group consisting of polyethylene, polypropylene and polybutene, stabilized against the action of heat, ageing and light with from about 0.02 to 2% by weight of a betacyanoethyl compound selected from the group consisting of tris(betacyanoethyl) acetophenone, monobetacyanoethyl dodecylamine, di(betacyanoethyl) hydroquinone obtained by reacting hydroquinone with acrylonitrile in molar proportions of 1:2 in the presence of metallic sodium at 120–130° C., monobetacyanoethyl octadecylamine, bis-9,9-(betacyanoethyl) fluorine, 9-(betacyanoethyl) carbazole, bis(betacyanoethyl) sulfide, betacyanoethyl phenol having a melting point of 62–65° C., di(betacyanoethyl) amine, tris(betacyanoethyl ethanol) amine, betacyanoethyl-2-oxynaphthalene, 2,2,5,5-tetra(betacyanoethyl) cyclopentanone, gamma acetyl-gamma isopropenylpimelonitrile, betacyanoethyl acetophenoxime, tris(betacyanoethyl) nitromethane, and betacyanoethyl dodecylmercaptan.

4. The product of claim 3 wherein the polymeric olefin is polypropylene consisting prevailingly of isotactic macromolecules.

5. The process according to claim 1, in which the polymeric olefin is polyethylene.

6. The process according to claim 1, in which the polymeric olefin is polypropylene consisting prevailingly of isotactic macromolecules.

7. The process according to claim 1, in which the polymeric olefin is polybutene.

8. The process according to claim 1, in which the cyanoethyl compound is bis-9,9-(betacyanoethyl) fluorene.

9. The process according to claim 1, in which the cyanoethyl compound is tris-(betacyanoethyl) acetophenone.

10. The process according to claim 1, in which the cyanoethyl compound is 9-(betacyanoethyl) carbazole.

11. The process according to claim 1, in which the cyanoethyl compound is di-(betacyanoethyl) hydroquinone obtained by reacting hydroquinone with acrylonitrile in molar proportions of 1:2 in the presence of metallic sodium at 120–130° C.

12. The process according to claim 1, in which the cyanoethyl compound is tris(betacyanoethyl ethanol) amine.

13. The process according to claim 1, in which the cyanoethyl compound is betacyanoethyl phenol having a melting point of 62–65° C.

14. The process according to claim 1, in which the cyanoethyl compound is 2,2,5,5-tetra(betacyanoethyl) cyclopentanone.

15. The process according to claim 1, in which the cyanoethyl compound is gamma-acetyl-gamma-isopropenyl-pimelonitrile.

16. The process according to claim 1, in which the cyanoethyl compound is betacyanoethyl acetophenoxime.

17. The process according to claim 1, in which the cyanoethyl compound is tris(betacyanoethyl) nitromethane.

18. The process according to claim 1, in which the cyanoethyl compound is betacyanoethyl dodecylmercaptan.

19. The process according to claim 1, in which the cyanoethyl compound is monocyanoethyl dodecylamine.

20. The process according to claim 1, in which the monobetacyanoethyl compound is cyanoethyl octadecylamine.

21. The process according to claim 1, in which the cyanoethyl compound is bis(betacyanoethyl)sulfide.

22. The process according to claim 1, in which the cyanoethyl compound is di(betacyanoethyl) amine.

23. The process according to claim 1, in which the cyanoethyl compound is 1(betacyanoethyl)2-oxy-naphthalene.

24. A composition according to claim 2, in which the polymeric olefin is polypropylene consisting prevailingly of isotactic macromolecules.

References Cited in the file of this patent

UNITED STATES PATENTS

| | | |
|---|---|---|
| 377,364 | Wiest et al. | Apr. 20, 1943 |
| 2,770,640 | Journeay | Nov. 13, 1956 |
| 2,881,147 | Graham | Apr. 7, 1959 |
| 2,985,617 | Salyer et al. | May 23, 1961 |

FOREIGN PATENTS

| | | |
|---|---|---|
| 557,293 | Canada | May 13, 1958 |
| 557,294 | Canada | May 13, 1958 |

UNITED STATES PATENT OFFICE
CERTIFICATE OF CORRECTION

Patent No. 3,143,523                         August 4, 1964

Cornelio Caldo

It is hereby certified that error appears in the above numbered patent requiring correction and that the said Letters Patent should read as corrected below.

Column 3, line 45, for "60/0.2x16" read -- 60/0.8x16 --; column 10, line 46, for "60/0.8x16" read -- 250° C. --; line 47, for "23 kg./cm.$^2$ " read -- 210° C. --; line 48, for "240m./min." read -- 210° C. --; column 12, line 8, after "mixing" insert -- with --; line 57, for "fluorine" read -- fluorene --; column 14, line 13, for "1(betacyanoethyl)" read -- betacyanoethyl --.

Signed and sealed this 2nd day of March 1965.

(SEAL)
Attest:

ERNEST W. SWIDER
Attesting Officer

EDWARD J. BRENNER
Commissioner of Patents